(12) United States Patent
Tao et al.

(10) Patent No.: US 10,053,369 B2
(45) Date of Patent: Aug. 21, 2018

(54) PRODUCTION OF AMMONIUM SULFATE USING A VACUUM ABSORPTION PROCESS

(71) Applicant: The Research Foundation for The State University of New York, Albany, NY (US)

(72) Inventors: Wendong Tao, Jamesville, NY (US); Anayo Thomas Ukwuani, Carson, CA (US)

(73) Assignee: The Research Foundation for The State University of New York, Albany, NY (US)

(*) Notice: Subject to any disclaimer, the term of this patent is extended or adjusted under 35 U.S.C. 154(b) by 0 days.

(21) Appl. No.: 15/484,653

(22) Filed: Apr. 11, 2017

(65) Prior Publication Data

US 2017/0291825 A1    Oct. 12, 2017

Related U.S. Application Data

(60) Provisional application No. 62/320,693, filed on Apr. 11, 2016.

(51) Int. Cl.

| | |
|---|---|
| *C01C 1/10* | (2006.01) |
| *C02F 1/06* | (2006.01) |
| *C02F 1/66* | (2006.01) |
| *B01D 53/14* | (2006.01) |
| *C02F 1/20* | (2006.01) |
| *B01D 19/00* | (2006.01) |
| *B01D 53/58* | (2006.01) |
| *C02F 3/28* | (2006.01) |
| *C01C 1/242* | (2006.01) |
| *C02F 101/16* | (2006.01) |
| *C02F 103/20* | (2006.01) |
| *C02F 103/32* | (2006.01) |

(52) U.S. Cl.
CPC .............. *C01C 1/10* (2013.01); *B01D 53/145* (2013.01); *B01D 53/1418* (2013.01); *B01D 53/1493* (2013.01); *C01C 1/242* (2013.01); *C02F 1/06* (2013.01); *C02F 1/20* (2013.01); *C02F 1/66* (2013.01); *C02F 3/2866* (2013.01); *B01D 2252/10* (2013.01); *C01P 2006/80* (2013.01); *C02F 2101/16* (2013.01); *C02F 2103/20* (2013.01); *C02F 2103/32* (2013.01)

(58) Field of Classification Search
CPC ...... C02F 2103/32; C02F 3/2866; C02F 1/06; C02F 1/66; C02F 2103/20; C02F 2101/16; C02F 1/20; C01P 2006/80; C01C 1/10; C01C 1/242; B01D 53/1481; B01D 53/145; B01D 53/1493; B01D 2252/10; B01D 19/00; B01D 19/0036; B01D 53/58

See application file for complete search history.

(56) References Cited

U.S. PATENT DOCUMENTS

| | | | | |
|---|---|---|---|---|
| 2,626,005 A | * | 1/1953 | Sebald | B01D 19/0068 95/244 |
| 4,522,638 A | * | 6/1985 | Karwat | B01D 53/1412 423/226 |
| 4,689,156 A | * | 8/1987 | Zibrida | C02F 1/20 210/747.9 |
| 4,738,754 A | * | 4/1988 | Hilsebein | C01C 1/10 203/42 |
| 5,702,572 A | * | 12/1997 | Fujimura | B01D 53/002 204/157.15 |
| 6,315,893 B1 | * | 11/2001 | Sawada | B01F 3/04758 210/120 |
| 9,085,470 B2 | * | 7/2015 | Kirchmayr | C02F 1/06 |
| 9,828,558 B2 | * | 11/2017 | McNamara | C10G 67/14 |
| 2006/0006055 A1 | * | 1/2006 | Bonde | B01D 3/346 203/73 |
| 2014/0033776 A1 | * | 2/2014 | Josse | C02F 1/20 71/10 |
| 2014/0263100 A1 | * | 9/2014 | Kumar | C05F 17/0018 210/770 |
| 2015/0329399 A1 | * | 11/2015 | Kumar | C01C 1/242 71/10 |
| 2016/0176768 A1 | * | 6/2016 | Norddahl | C12M 21/04 71/10 |

FOREIGN PATENT DOCUMENTS

| | | | | |
|---|---|---|---|---|
| ES | 2304299 A1 | * | 10/2008 | ............... C01C 1/10 |
| KR | 20140097827 A | * | 8/2014 | ............... C02F 1/20 |

* cited by examiner

*Primary Examiner* — Timothy C Vanoy
(74) *Attorney, Agent, or Firm* — Scully, Scott, Murphy & Presser, P.C.

(57) ABSTRACT

The present disclosure is directed to methods for treating an organic material, including the steps of transporting the organic material into a first vessel; heating the organic material in the first vessel and applying a negative pressure to the organic material in the first vessel to a boiling point of the organic material, wherein the heat and negative pressure separates a portion of an ammonia from the organic material; removing the portion of the ammonia from the first vessel; transporting the removed portion of the ammonia from the first vessel to an acid solution in a second vessel; and separating a portion of the ammonia from the acid solution.

22 Claims, 5 Drawing Sheets

PRODUCTION OF AMMONIUM SULFATE USING A VACUUM ABSORPTION PROCESS

CROSS REFERENCE TO RELATED APPLICATIONS

The present application claims the benefit of priority from U.S. Provisional Application No. 62/320,693, filed Apr. 11, 2016, the entire contents of all of which are incorporated herein by reference.

STATEMENT REGARDING FEDERALLY SPONSORED RESEARCH OR DEVELOPMENT

This invention was made with government support under grants SU-83572301-0 and SU-83593701-0 awarded by the Environmental Protection Agency. The government has certain rights in the invention.

BACKGROUND OF THE DISCLOSURE

Anaerobic digestion is increasingly applied to various organic wastes to stabilize organic matter and recover energy from biogas. Ammonia is often accumulated to a level that inhibits methanogenesis (the last step of anaerobic digestion), especially in anaerobic digestion of protein-rich substrates such as dairy manure and food waste. Moreover, disposal and treatment of digester effluent with high concentrations of ammonia presents an economic challenge and environmental risks.

What is desired is a method and apparatus than can recover ammonia from a source. Embodiments of the present disclosure provide methods that address the above and other issues.

SUMMARY OF THE DISCLOSURE

The present disclosure is directed to methods for treating an organic material, including the steps of transporting the organic material into a first vessel; heating the organic material in the first vessel and applying a negative pressure to the organic material in the first vessel to a boiling point of the organic material, wherein the heat and negative pressure separates a portion of an ammonia from the organic material; removing the portion of the ammonia from the first vessel; transporting the removed portion of the ammonia from the first vessel to an acid solution in a second vessel; and separating a portion of the ammonia from the acid solution.

BRIEF DESCRIPTION OF THE DRAWINGS

The present disclosure will be better understood by reference to the following drawings of which.

DETAILED DESCRIPTION OF THE DISCLOSURE

Figure 1A:
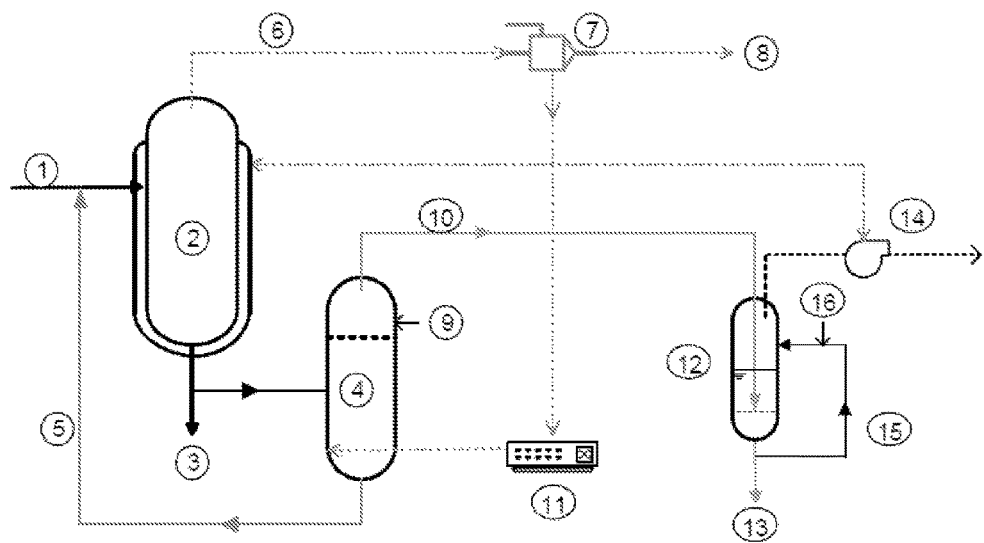
FIG. 1A is an example of a flow diagram.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

The present disclosure is directed to the coupling of vacuum thermal stripping and acid absorption for recovery of ammonia from, for example, digestate. The present disclosure can also be used to remove and/or recover ammonia from many different liquid sources, such as, for example, digester effluent, livestock wastewater and manure, landfill leachate, food waste recycling wastewater, food processing wastewater, municipal wastewater operations and commercial wastewater operations.

The disclosed process can be used alone or together with anaerobic digestion. When the disclosed ammonia recovery structure and process is used in conjunction with anaerobic digestion, ammonia inhibition to methanogenesis is reduced and the digesters can be loaded at higher rates of organic feedstock. The disclosed process also can remove a portion of the ammonia and recovers it as a commodity, ammonium sulfate granules.

The disclosed vacuum thermal stripping—acid absorption system mainly includes a stripping vessel and a gas absorption column. Aqueous ammonium is converted to free ammonia at about pH 9 and vaporized from digestate in a stripping vessel under given temperature and vacuum, e.g., about 65° C. and about 28 kPa.

Relatively efficient thermal stripping of ammonia includes heating the side-stream of digestate to boiling. Upon thermal stripping of ammonia, the heated side-stream can be returned to the digesters for heat recycling. Based on energy balance, digestate can be recirculated for ammonia recovery at about 70° C. at a flow rate of approximately 52% of the volumetric loading rate to mesophilic digesters. A vacuum can be introduced to a stripping vessel to decrease the boiling point temperature so that more digestate can be withdrawn for ammonia recovery while maintaining digestate temperature. The stripped ammonia is diverted by a vacuum pump to a gas absorption column which contains a sulfuric acid solution.

Ammonia reacts with sulfuric acid to form ammonium sulfate. As the sulfuric acid solution becomes saturated with ammonium sulfate, ammonium sulfate granules are formed as more ammonia is absorbed to the acid solution. The ammonium sulfate granules can be collected by draining the solution with a sieve and air-dried.

The stripping vessel can also include a demister on a kettle reboiler to increase water reflux. This demister avoids the granules of ammonium sulfate from being affected by water vapor in the stripping vessel condensing in the acid solution.

Upon formation of the ammonium sulfate granules, washing with acetone, methanol and/or ethanol can increase purity, and adding cool or cold ethanol, can enhance granulation.

The disclosed process can produce relatively high purity, higher than about 98% ammonium sulfate granules.

One example of the present system and method is shown in FIG. 1A.

In FIG. 1A, a digester feed 1 enters an anaerobic digester 2, where it exits as digester effluent 3 and biogas 6. A portion of digester effluent 3 enters stripper 4, which also can receive a dose of NaOH 9. Stripper 4 can be temperature controlled by temperature controller 11. A portion of the material in stripper 4 is recycled back into digester feed 1 through a recirculation line 5, which also recycles the heat in stripper 4. Ammonia 10 exits stripper 4 and enters absorption column 12.

Absorption column 12 has two outputs, $(NH_4)_2SO_4$ crystals 13 and spent acid solution 15 that recycles back into absorption column 12 with the addition of sulfuric acid 16. A vacuum pump 14 draws a vacuum in absorption column 12. The vacuum pump 14 is also in fluid communication with anaerobic digester 2, such that the pressure in anaerobic digester can be modified.

Referring again to biogas 6, biogas 6 enters a generator 7 that produces heat and power as an energy credit 8. Generator 7 can produce heat and/or energy to temperature controller 11. In this system, biogas production via anaerobic digestion can be enhanced by thermal treatment during thermal stripping. Also in this system, thermal treatment of digestate may enhance hydrolysis, thus increasing methane and ammonia production of anaerobic digestion when the ammonia-recovered side-stream is returned to digesters. Moreover, the thermal treatment may improve dewaterability of digester effluent.

The above system can be operated in batch modes or continuously.

Figure 1B:
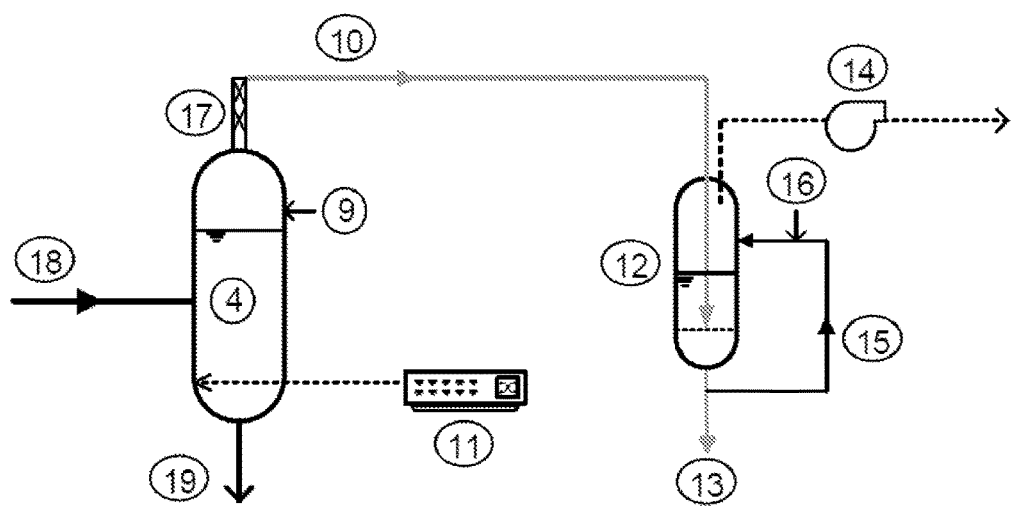
FIG. 1B is an example of a flow diagram.

Another example of the present system and method is shown in FIG. 1B.

The components having the same reference numbers in FIG. 1B are the same as those in FIG. 1A. One of the differences between the embodiment of FIG. 1A and that of FIG. 1B is that the system of FIG. 1B does not include an anaerobic digester, and that an ammonia-rich water 18 is introduced directly to the stripper 4. Exiting stripper 4 is both an ammonia stream 10 and a stream that undergoes a temperature sensitive treatment, e.g., ammonia removal through simultaneous aerobic ammonia oxidation and anaerobic ammonia oxidation which are favored at about 30° C. to about 40° C.

Prior to exiting the stripper 4, the resultant ammonia stream 10 passes through a demister 17. FIG. 1A can also include a demister in the same location as that of FIG. 1B, although one is not illustrated.

Demister 17 retains up to about 97%, or greater, of water within the vessel of stripper 4, such that water does not enter absorption column 12. The demister can be any suitable column shape and can include any suitable material that acts to trap water droplets and condense water vapor into liquid water. For example, demister 17 can be a pipe that is packed with a metal and/or plastic mesh and can have a diameter of about 18% of the stripper 4 diameter (or cross-sectional distance if not cylindrical). In other embodiments, the demister 17 can be about 5%, about 10%, about 15%, about 20%, about 25%, about 30%, about 35%, about 40% or more of the diameter (or cross-sectional distance if not cylindrical) of the stripper 4. Both the stripper 4 and the demister 17 can be appropriately scaled, up or down, depending on flow requirements.

The above system can be operated in batch modes or continuously.

The methods, apparatus and compositions of the present disclosure will be better understood by reference to the following Examples, which are provided as exemplary of the disclosure and not by way of limitation.

Example 1

One Example of a method is discussed below.

Boiling points were found at 7 combinations of temperature and vacuum pressure for dairy manure digestate as shown below in Table 1, which also includes ammonia mass transfer kinetic constants and removal efficiency:

TABLE 1

| Boiling conditions | | | | | | | |
|---|---|---|---|---|---|---|---|
| Temperature ° C. | | | | | | | |
| 50 | 58 | 65 | 70 | 80 | 90 | 100 |
| Vacuum pressure, kPa | | | | | | | |
| 16.6 | 20.0 | 25.1 | 33.6 | 54.0 | 74.2 | 101.3 |
| $K_L$, mm/h$^a$ | | | | | | | |
| 21.0 ± 5.0 | 21.8 ± 3.8 | 37.3 ± 8.8 | 31.1 ± 7.4 | 33.9 ± 11.2 | 33.8 ± 5.7 | 31.3 ± 5.3 |
| $C_s$, mg N/L$^a$ | | | | | | | |
| 24 ± 26 | 24 ± 34 | 0 ± 0 | 3 ± 7 | 13 ± 26 | 1 ± 2 | 1 ± 1 |
| Total ammonia remaining at 1.5 h, %$^b$ | | | | | | | |
| 21.3 | 20.4 | 4.2 | 7.6 | 9.5 | 7.2 | 9.2 |
| Total ammonia remaining at 3 h, %$^b$ | | | | | | | |
| 6.7 | 5.9 | 0.1 | 1.0 | 3.1 | 0.1 | 0.1 |

$^a$Mean ± standard deviation (n = 5).
$^b$Average percentage (n = 5) of ammonia remaining after a given time of vacuum thermal stripping (excluding 1 h of temperature ramping).

In Table 1 above, the 1.5 hour and 3 hour times refer to times the liquid was within the stripper 4.

The initial ammonia concentration for each temperature/pressure combination was different, as follows from the left (first combination of 50° C./16.6 kPA) to right (last combination of 100° C./101.3 kPa), 1478 mg N/L, 1400 mg N/L, 1774 mg N/L, 1478 mg N/L, 1407 mg N/L, 1698 mg N/L, and 1788 mg N/L, respectively.

Vacuum thermal stripping of dairy manure digestate at all boiling points, each temperature and vacuum pressure of Table 1, was effective.

Figure 2A:
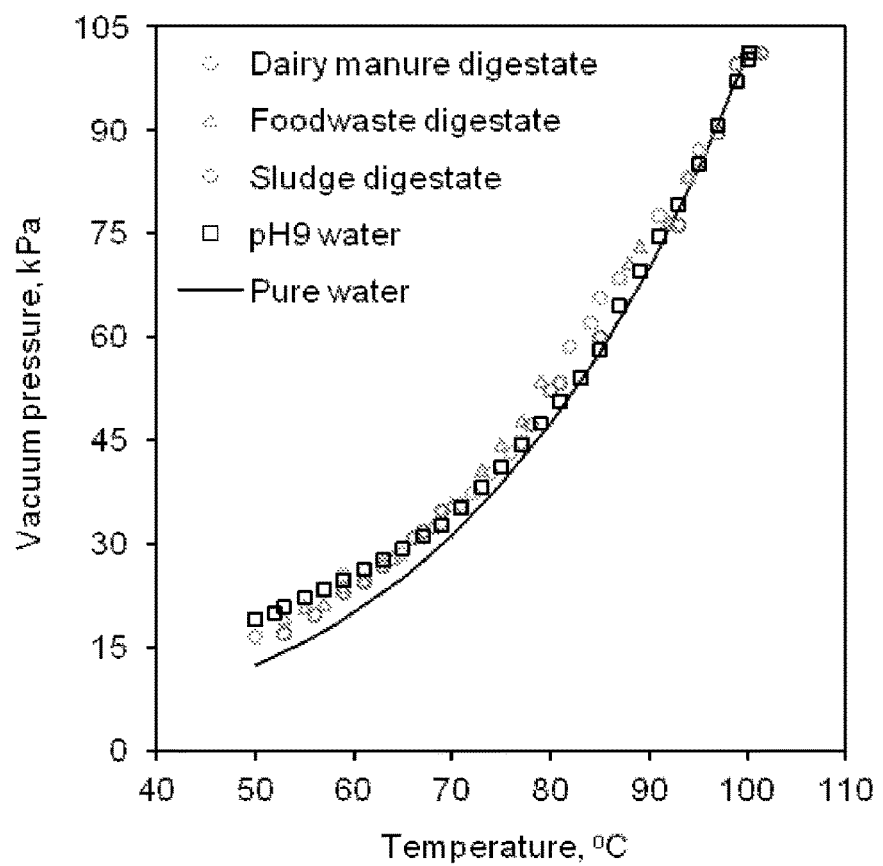
FIG. 2A is a graphical representation of the boiling point combination of vacuum pressure and temperature for varying materials.

Boiling points for water, pH9 water, sludge digestate and foodwaste digestate were also determined and are illustrated in FIG. 2A. FIG. 2A shows similar results for these varying materials as compared to dairy manure digestate. The three types of digestate of FIG. 2A had total solids concentrations of 23.4-50.1 g/L. The boiling points were fitted (regression $R^2$=0.996; p<0.001) with a modified Antoine equation as follows: Ln (P)=113.245/T+4.268 Ln (T)−16.173; where P=absolute pressure of vacuum, kPa and T is digestate temperature, ° C.

Figure 2B:
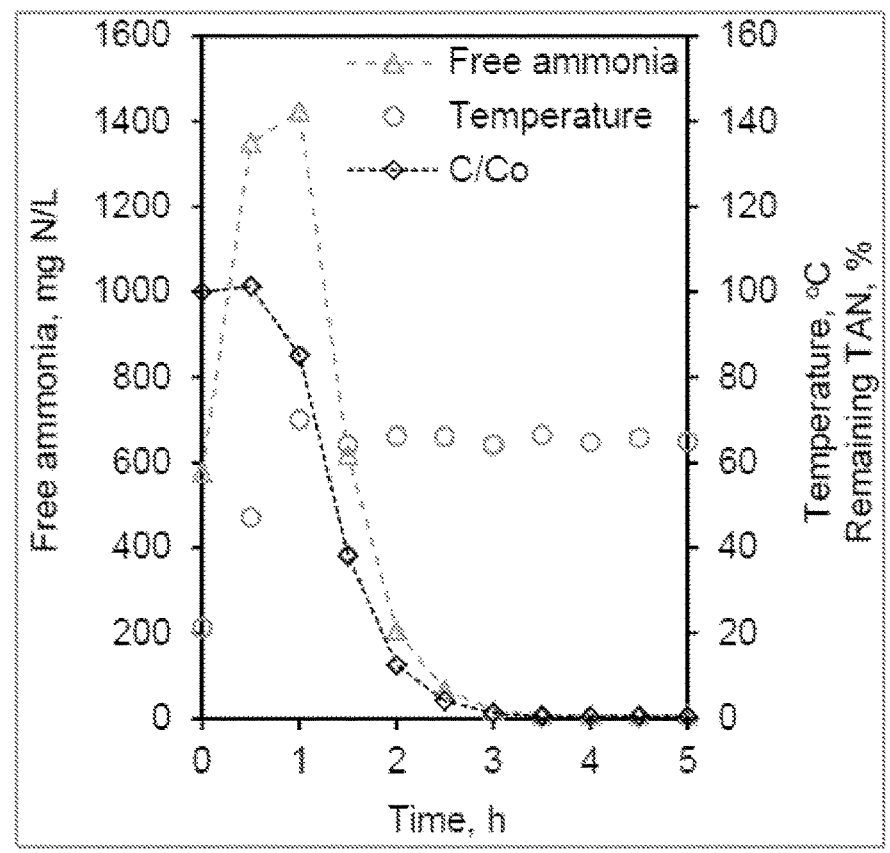
FIG. 2B is a graphical representation of an amount of ammonia over time as it relates to temperature.

Further regarding the dairy manure digestate of FIG. 2A and Table 1, after approximately one hour of heating, feed temperature was increased to the set point (for example, 65° C.). Upon completion of vacuum thermal stripping with anaerobically digested dairy manure in about 3-4 hours, ammonia concentration could be reduced to less than about 11 mg N/L and about 8.2 kg ammonium sulfate could be produced per cubic meter of digestate, as shown in FIG. 2B.

The cycle length to operate vacuum thermal stripping by a batch mode can be adjusted based upon the feed and effluent ammonia concentrations and the dimensions of a vacuum stripper. Moreover, the increase in temperature time could be shortened.

As one example, dairy manure in a volumetric rate of 109.62 m$^3$/d can be anaerobically digested at 37° C. Digester effluent can be drawn at about 0.61 time the volumetric rate for ammonia recovery and returned to the digesters after ammonia recovery. Total ammonia concentration of digester effluent can decrease from about 1500 mg/L to about 971 mg/L due to ammonia recovery.

Each batch of vacuum thermal stripping can last for about 2.6 hours to reduce total ammonia concentration to about 100 mg N/L. Consequently, about 4.1 kg ammonium sulfate can be produced with one cubic meter of digestate.

As another example, municipal organic waste in a volumetric rate of about 288 m$^3$/d can be anaerobically digested at 38.5° C. When about 50% or about 25% of the digester effluent is withdrawn for ammonia recovery and combined post-recovery with the remaining about 50% or about 70% of digester effluent, then digestate temperature is raised to about 52° C. or about 45° C. for downstream solid-liquid separation and biological treatment of the separated liquid.

The concentration of total ammonia to the downstream sequencing batch reactors can decrease from about 3700 mg/L to about 1942 or about 2821 mg/L due to ammonia recovery. Each batch of vacuum thermal stripping can last for about 1.6 hours to reduce total ammonia concentration to about 185 mg N/L. Consequently, about 16.6 kg ammonium sulfate can be produced with one cubic meter of digestate.

Example 2

A dairy farm in central New York State, USA, with 1,100 milking cows was the source of a raw material in this example. In this example a secreted manure and used bedding were scraped off the barns' concrete floors, mixed with milking washwater, and treated in two plug-flow anaerobic digesters at mesophilic temperatures (about 37° C. on average). When the ammonia recovery process is applied to an anaerobic digester recirculation line, the need to heat the digesters is eliminated or reduced.

A combined heat and power system used the biogas to heat the liquid manure fed to the anaerobic digesters. The digesters were operated in parallel and have a total liquid manure loading rate of 110,000 L/d. Digester effluent passed through a screw press separator. The separated solids were composted, and used for bedding or sold.

The separated liquid can be stored and used to irrigate cropland.

Example 3

Figure 3:
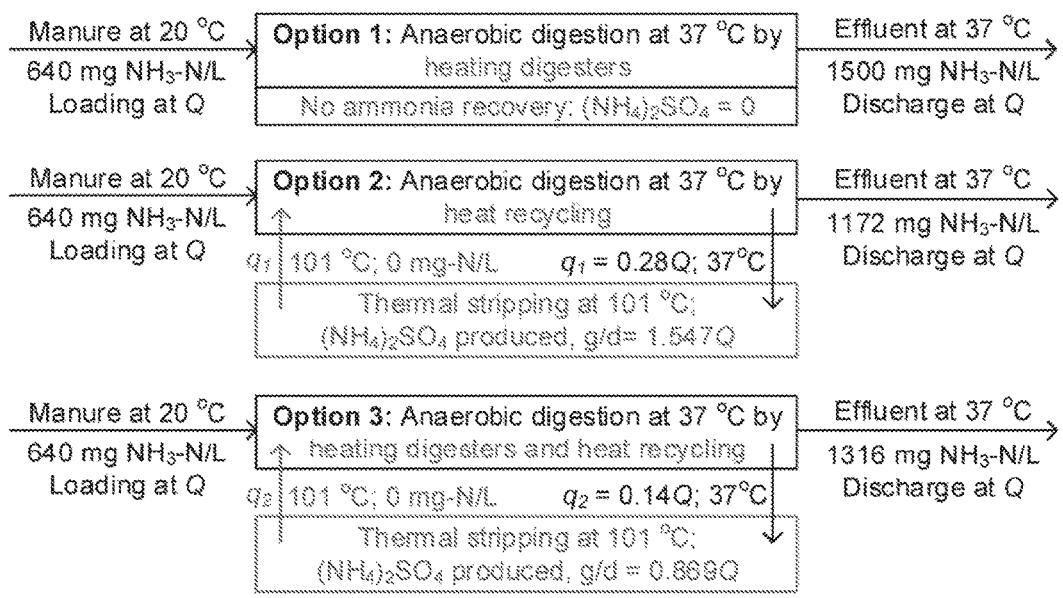
FIG. 3 is a graphical representation of three operating conditions.

Three options are discussed for ammonia recovery by the thermal stripping—acid absorption process, using the two digesters, as shown in FIG. 3. In FIG. 3, options for integrating thermal stripping—acid absorption into anaerobic digestion of liquid dairy manure are shown. In FIG. 3, Q=manure loading rate to two digesters=110,000 L/d; q=recirculation rate.

As shown in FIG. 3, Option 1 is the baseline condition without ammonia recovery. The conceptual design sets the digester feedstock temperature at 20° C. and the total ammonia concentration at 640 mg-N/L, based on the measured ammonia concentration in manure liquor and the manure solids content. The digested dairy manure has an average total ammonia concentration of 1,500 mg-N/L.

As shown in FIG. 3, Option 2 is to draw off digester effluent at 28% of the digester loading rate, heat it to 101° C. for ammonia recovery, and return the ammonia-recovered digestate to the anaerobic digesters for heat recycling. Based on water budget and heat balance analysis, recovering ammonia at this recirculation rate eliminates the need to heat the mesophilic digesters and avoids over-heating the mesophilic digesters. It is estimated that the specific heat is 4.014 kJ/kg/° C. for digested dairy manure with a total solids concentration of 6.1%, and 3.843 kJ/kg/° C. for raw dairy manure with a total solids concentration of 11.3%.

As shown in FIG. 3, Option 3 is similar to Option 2, but the recirculation rate is 14% of the digester loading rate and additional digester heating is needed. The resulting digester effluent concentration and amount of ammonium sulfate produced are estimated using mass balance analysis, as in FIG. 1.

Therefore, as can be seen in FIG. 3, the disclosed thermal stripping-acid absorption process is effective at removing nitrogen from the effluent stream. Further, because of the shorter hydraulic retention time in the digesters and the enhanced hydrolysis of organic matter due to treatment during thermal stripping under options 2 and 3, relative to Option 1, it is conservatively assumed that the ammonification rate under options 2 and 3 will be the same as that achieved presently—i.e., Option 1.

Example 4

The absorption column 12, discussed above has an output of $(NH_4)_2SO_4$ crystals 13 and includes an input of sulfuric acid 16. This example details the output amount and purity of the $(NH_4)_2SO_4$ crystals 13 based on various feed streams.

Ammonium sulfate solubility in water is high and increases with temperature, for example, 75.13 g/100 g $H_2O$ at 20° C. and 80.83 g/100 g $H_2O$ at 40° C. Recovering $(NH_4)_2SO_4$ in crystals has several benefits relative to a solution. Solid form of $(NH_4)_2SO_4$ has orthorhombic crystalline structure with a density of about 1.769 g/mL at 20° C., which can be settled and be collected. The content of $(NH_4)_2SO_4$ in the solid products varied with the methods to harvest a product from the ammonia-absorbed acid solution, the saturation conditions, and final $H_2SO_4$ content.

When $H_2SO_4$ content remaining in the acid solutions after vacuum thermal stripping of dairy manure digestate and low-ammonia foodwaste digestate was high (7.1-15.4% w/w), $H_2SO_4$ accounted for 30.5-50.1% of the solid products and $(NH_4)_2SO_4$ content was relatively low (52.4-82.3%). When acid solution was saturated with $(NH_4)_2SO_4$ and final $H_2SO_4$ concentration was low (2.4% w/w) in the stripping of the landfill leachate, $(NH_4)_2SO_4$ formed in white hygroscopic long crystals with high purity.

When stripping the high-ammonia foodwaste digestate, $H_2SO_4$ was depleted and white hygroscopic powdery crystals were harvested with high purity. When stripping the municipal sludge digestate and using an acid solution saturated with $(NH_4)_2SO_4$, the final $H_2SO_4$ concentration was still high (10.1% w/w) and the solid product had moderate $(NH_4)_2SO_4$ content. To produce a solid product with high $(NH_4)_2SO_4$ content, therefore, it is desirable to maintain $H_2SO_4$ concentration at 2-4% (w/w) in the acid solution.

When $CO_2$ in air entered an acid solution through the vacuum pump 14, $NH_4HCO_3$ and $(NH_4)_2CO_3.H_2O$ could form, especially when sulfuric acid was largely consumed and pH increased to above 7. Both $NH_4HCO_3$ and $(NH_4)_2CO_3.H_2O$ are white crystals. Because the equivalent weight of $(NH_4)_2CO_3$ is smaller than that of $(NH_4)_2SO_4$, the $(NH_4)_2SO_4$ contents of the harvested solid products estimated with the following equation: $C_{AS}=100*A*66/W$, wherein $C_{AS}$ is the content of $(NH_4)_2SO_4$ in recovered production %, W is the weight of solid product dissolved in 1 L of deionized water in mg, A is the least of the normal concentrations of ammonium and sulfate in the product solution in meq/L, with 66 being the equivalent weight of $(NH_4)_2SO_4$; were sometimes greater than 100% as seen in Table 2 below.

TABLE 2

Quality of solid products recovered by vacuum thermal stripping-acid absorption in the pilot system.

| Feed source | Method to harvest crystals | $(NH_4)_2SO_4$ content, % (w/w) | Initial $H_2SO_4$, % (w/w) | Final $H_2SO_4^a$, % (w/w) | $(NH_4)_2SO_4$ initially added to acid |
|---|---|---|---|---|---|
| Dairy manure digestate | Air-dried | 52.4-64.5 | 9.4 | 7.1 | None |
| | Oven-dried | 63.0-69.4 | 9.4 | 7.1 | None |
| | Ethanol-induced | 80.2-82.3 | 9.4 | 7.1 | None |
| High-ammonia foodwaste digestate | Vacuum-dried | 100.0-102.3 | 18.0 | 0 | None |
| | Air-dried | 102.2-103.9 | 18.0 | 0 | None |
| | Oven-dried | 103.7-103.8 | 18.0 | 0 | None |
| | Ethanol-induced | 94.7-99.2 | 18.0 | 0 | None |
| Low-ammonia foodwaste digestate | Ethanol-induced | 63.9-70.0 | 18.0 | 15.4 | None |
| Municpal sludge disgestate | Air-dried | 87.4-92.7 | 11.6 | 10.1 | Saturated |
| Retenate of landfill leachate | Direct cystallization | 94.3-106.8 | 15.9 | 2.4 | Saturated |
| | Oven-dried | 90.3-92.3 | 9.4 | 0.8 | None |

$^a$Estimated stoichiometrically with the mass of ammonia stripped out of feed.

The slightly lower $(NH_4)_2SO_4$ contents in the air-dried products than those of oven-dried products could be attributed to the inadequate dryness by air-drying, especially when sulfuric acid concentration in an acid solution was still high. Moreover, $(NH_4)_2SO_4$ may react with $H_2SO_4$ to form ammonium bisulfate, $(NH_4)HSO_4$, which has a solubility of 115.1 g/L at 20° C. The $(NH_4)_2SO_4$ content could be underestimated by the above equation for the crystals recovered from stripping of the low-ammonia foodwaste digestate when $H_2SO_4$ concentration in the final acid solution was still high that the product of $H_2SO_4$ and $(NH_4)_2SO_4$ concentrations was greater than the solubility product of $(NH_4)HSO_4$.

Further, no organic compounds were detected in the recovered solid products. This further confirms that the recovered crystals are of a high quality.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. A method of treating an organic material, the method comprising:
   transporting the organic material into a first vessel;
   heating the organic material in the first vessel and applying a negative pressure to the organic material in the first vessel to a boiling point of the organic material, wherein the heat and negative pressure separates a portion of an ammonia from the organic material;
   removing the portion of the ammonia from the first vessel;
   transporting the removed portion of the ammonia from the first vessel, through a demister, to an acid solution in a second vessel; and
   separating a portion of the ammonia from the acid solution.

2. The method of claim 1, wherein the portion of the ammonia separated from the acid solution is $(NH_4)_2SO_4$.

3. The method of claim 2, wherein the $(NH_4)_2SO_4$ is in the form of a $(NH_4)_2SO_4$ crystal.

4. The method of claim 3, wherein the $(NH_4)_2SO_4$ crystal is of a purity of between about 94.3% and about 106.8%.

5. The method of claim 1, wherein the acid solution in the second vessel comprises $H_2SO_4$.

6. The method of claim 5, wherein the concentration of $H_2SO_4$ is between about 2% and about 4% (w/w).

7. The method of claim 1, wherein a diameter of the demister is about 5% to about 40% of the diameter of the first vessel.

8. The method of claim 1, wherein a diameter of the demister is about 18% of the diameter of the first vessel.

9. The method of claim 1, further comprising a step of removing a waste stream from the second vessel.

10. The method of claim 9, wherein an ammonia concentration in the waste stream is between about 4.2% and about 21.3% of an ammonia concentration of the organic material in the first vessel after about 1.5 hours of treatment.

11. The method of claim 9, wherein an ammonia concentration in the waste stream is between about 0.1% and about 6.7% of an ammonia concentration of the organic material in the first vessel after about 3 hours of treatment.

12. A method of treating an organic material, the method comprising:
   transporting the organic material into a first vessel;
   heating the organic material in the first vessel and applying a negative pressure to the organic material in the first vessel to a boiling point of the organic material, wherein the heat and negative pressure separates a portion of an ammonia from the organic material;
   removing the portion of the ammonia from the first vessel;

transporting the removed portion of the ammonia from the first vessel to an acid solution in a second vessel;

separating a portion of the ammonia from the acid solution;

removing a waste stream from the second vessel.

13. The method of claim 12, wherein the portion of the ammonia separated from the acid solution is $(NH_4)_2SO_4$.

14. The method of claim 13, wherein the $(NH_4)_2SO_4$ is in the form of a $(NH_4)_2SO_4$ crystal.

15. The method of claim 14, wherein the $(NH_4)_2SO_4$ crystal is of a purity of between about 94.3% and about 106.8%.

16. The method of claim 12, wherein the acid solution in the second vessel comprises H2SO4.

17. The method of claim 16, wherein the concentration of $NH_2SO_4$ is between about 2% and about 4% (w/w).

18. The method of claim 12, further comprising a step of passing the removed portion of the ammonia from the first vessel through a demister before the portion is transported to the second vessel.

19. The method of claim 18, wherein a diameter of the demister is about 5% to about 40% of the diameter of the first vessel.

20. The method of claim 18, wherein a diameter of the demister is about 18% of the diameter of the first vessel.

21. The method of claim 12, wherein an ammonia concentration in the waste stream is between about 4.2% and about 21.3% of an ammonia concentration of the organic material in the first vessel after about 1.5 hours of treatment.

22. The method of claim 12, wherein an ammonia concentration in the waste stream is between about 0.1% and about 6.7% of an ammonia concentration of the organic material in the first vessel after about 3 hours of treatment.

* * * * *